2,934,439
PRESERVATION PROCESS WITH DIEPOXY-
BUTANE

Harold David Michener and James C. Lewis, Berkeley, Calif., assignors to the United States of America as represented by the Secretary of Agriculture No Drawing. Application February 18, 1959
Serial No. 794,214

4 Claims. (Cl. 99—150)

(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to the preservation of substances which are normally subject to microbial spoilage. More particularly, the invention concerns, and has as its prime object, the provision of novel processes for treating such substances whereby to destroy the microbial population which they harbor to the end that the substances can be preserved without spoilage.

The commonest method of sterilizing substances involves application of heat. Such procedure though widely used is subject to certain disadvantages. A particular problem is that the degree of heating required to destroy the infesting microbial life, especially spores, often causes undesirable changes in the intrinsic properties of the substances in question. Depending on the composition of the substance being subjected to the heat sterilization, such deleterious changes may occur as for example: denaturation of proteins; degradation of starch or other high polymers into smaller fragments; hydrolysis of ester, peptide, and other structures susceptible to hydrolysis; decomposition of labile compounds such as vitamins, flavor components, etc. The problems which are encountered are particularly demonstrated by reference to canning of foods. The common canning method of preserving perishable foods involves placing the food in a sealed container—usually a can—and then subjecting the container and its contents to heat for an extended period of time. This method is effective and universally used but has the disadvantage that the combination of temperature and heating time adequate to destroy the microbial population of the foodstuff is deleterious to the foodstuff itself, because some forms of microbial life, particularly bacterial spores, are very resistant to heat. For example, in non-acid foods the spores of *Bacillus stearothermophilus* and *Clostridium botulinum* are destroyed only after prolonged heating at 240° F. Both of these organisms must be destroyed for a successful pack since the former is the cause of flat-souring and the latter the cause of development of a deadly toxin in the food. Modern processors use temperatures well above 212° F. and long periods of heating (as high as 60–200 minutes, or more) to insure destruction of these organisms. For example, an authoritative canner's association recommends the following minimum heating times for processing vegetables in No. 2 cans at 240° F., namely: green beans, 20 min.; carrots, 30 min.; peas, 35 min.; corn, 50 min. As a result of such drastic heat treatment, the color, flavor, and texture of the product are necessarily adversely affected. Thus the majority of ordinary canned foods are inferior in color, texture, and flavor to the fresh-cooked products.

It has now been found that if diepoxybutane is incorporated into the substance to be preserved prior to heat-processing the disadvantages outlined above are obviated. That is, only a relatively mild heat treatment is necessary to provide a sterile product whereby deleterious changes in the characteristics of the substance are greatly minimized. For example, foods canned in accordance with the invention are markedly superior in color, flavor, and texture as compared to conventional canned products.

The effectiveness of the process of the invention is based on the fact, hitherto unknown, that diepoxybutane possesses the ability to markedly decrease the thermal resistance of bacterial spores. That is, bacterial spores in the presence of this compound are killed by a much smaller amount of heat than required in the absence of the compound. As a direct consequence of this property, substances can be successfully sterilized with the application of much less heat than that which would be required to sterilize the product in the absence of diepoxybutane.

It is to be emphasized that the ability of diepoxybutane to decrease the thermal resistance of bacterial spores is unusual. We have tested some 640 different substances and have found 590 of these to possess negligible ability to decrease thermal resistance of spores. Also, of the 50 substances remaining, only 26 were sufficiently active to warrant further investigation. In conducting these tests, spores of Clostridium sp. PA–3679, an organism commonly used in evaluating food sterilization processes, were suspended in pea-pork broth containing the substance to be tested, and sealed in thermal death time tubes. Each tube contained approximately $6 \times 10^5$ spores in 2 ml. broth. Appropriate controls with no test substances were included in each run. The tubes were heated sufficiently (10 to 14 min. at 113° C. in an oil bath) to kill 75 to 95% of the spores in the control tubes. The contents of the tubes after cooling were diluted 1:1000 and plated on agar to count the surviving spores. By comparing the counts of the controls and samples containing additives, the effect of the additive on the D value can be ascertained, the D value being the time required at a given temperature to kill 90% of the spores. Surprisingly enough, our tests indicated that many antibiotics did not materially reduce the D value. Among these were: actinomycin, actithiazic acid, aspergillic acid, bacitracin, burdock antibiotic, circulin sulphate, citrinin, chlorotetracycline, clavicin, comirin, dihydroquercetin, dihydrotomatidine, endomycin, fumagillin, grifolin, helixins A and B, licheniformin A–5, neomycin, nigericin, oxytetracycline, pleocidin, polymixin D, streptomycin, streptothricin, subtenolin, tetracycline, tomatodine, tomatine, usnic acid, and penicillin.

It is also to be noted that the process of this invention does not depend on any ability of the described compound to destroy microbial forms on contact. Thus diepoxybutane exhibits little if any ability to destroy spores on mere contact. It is only by the cooperative effect of this compound and heat that the extraordinary destruction of bacterial spores is attained.

The compound employed in accordance with the invention is diepoxybutane, also known as butadiene dioxide. It has the formula

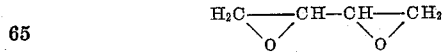

In the test explained above, diepoxy butane gave a reduction in D value of 50% at a concentration of 360 parts per million and a reduction of over 80% at 1000 parts per million.

Diepoxybutane exhibits many advantages over monoepoxides. For example it is much more effective in reducing the resistance of spores than either of the compounds propylene oxide or butylene oxide. Moreover, it is almost as effective in this regard as ethylene oxide while offering substantial benefits thereover. Thus ethylene oxide is a gas at normal temperatures. This property makes it difficult to apply in controlled concentration. Moreover ethylene oxide presents an extreme explosion hazard. On the other hand diepoxybutane is a liquid at normal temperatures and has a boiling point of about 150° C. Its liquid character permits it to be readily dispensed in controlled amounts. Moreover, it does not involve an explosion hazard. Another point is that ethylene oxide involves a toxicity problem as it forms ethylene glycol which is oxidized in the body to oxalic acid. Diepoxybutane is not toxic in the concentrations involved.

The effectiveness of diepoxybutane and various monoepoxides in reducing the thermal resistance of spores of Clostridium sp. PA-3679 is demonstrated in the following table—

| Compound | Concentration required for 50% reduction in D value, p.p.m. | Concentration required for 70% reduction in D value, p.p.m. |
| --- | --- | --- |
| Diepoxybutane | 360 | 600 |
| Ethylene oxide | 200 | 300 |
| Propylene oxide | 1300 | 2000 |
| Butylene oxide | ca. 2500 | |

In preserving substances in accordance with the invention, it is only necessary to incorporate diepoxybutane with the substance in question and then subject the treated substance with heat to effectuate the sterilization. Ordinarily, the substance to be preserved and the added compound are sealed in a container prior to heat treatment thus to prevent reinfection of the sterilized product with microbial forms from the environment. Thus, for example, in the preservation of foods diepoxybutane is incorporated with the food, the treated food is sealed in a can or other suitable container, and the container and contents subjected to a heat treatment to sterilize the product.

The concentration of diepoxybutane to be used depends on such factors as the nature of the substance to be preserved, especially the microbial population thereof, and the level to which the usual heat-processing program is to be decreased while still maintaining a sterile product. In many cases as little as 50 p.p.m. of the compound will give a reduction in thermal resistance and the concentration can be increased as high as needed, for example to 1000 p.p.m. to get further reduction in thermal resistance of the spores, hence further reduction in the amount of heat processing required for a satisfactory sterilization.

As in conventional canning, the temperature and time for heating the substance containing the added diepoxybutane will vary depending on many factors including the interrelationship of time and temperature, the nature of the substance to be preserved, its microbial population, etc. An additional factor, as noted above, is the concentration of added diepoxybutane. Thus in the preservation of foods in accordance with the invention, such factors as acidity of the food, good sanitary condition of the food, and high concentration of added diepoxybutane make for a lesser degree of heat treatment. Also, as in conventional canning, one must take into account the size of the container since with large containers one must allow more time for penetration of heat into the interior than with a small container. The effect of some of these factors can be predetermined, at least on an approximately quantitative basis. For example it is generally observed that by increasing the temperature 18° F., the heat processing time (apart from come up and cooling time) is reduced to about one-tenth the time required at the lower temperature. If the spore load on the product to be preserved is increased from 1000 spores per can to 1,000,000 spores (of the same heat resistance) the process time must be approximately doubled. If the pH is lowered from 6 to 5, the process time may be reduced to one-half, more or less. However, a factor which cannot be predetermined on any practicable basis is the heat resistance of the spores encountered. Thus the spores present on the substance to be preserved may exhibit thermal death rates which differ by factors of 1000 or more. Moreover, it is not practicable to determine what types of spores are present or what thermal death rates they possess. Such a program would be too expensive and involved. Moreover, it would only apply to one sample of material; other samples might exhibit entirely different spore populations. The net result is that the only feasible method to determine adequate heat processing times is to conduct pilot trials at different times and temperatures and to observe the products for indications of spoilage. Taking into account these considerations, in carrying out the process of the invention, the product to be preserved after addition of diepoxybutane is subjected to temperatures in the range about from 200 to 300° F. such temperature being applied for a period of time ranging about from one to 120 minutes. In any particular case the proper heat processing treatment can be ascertained by running pilot experiments in which containers of substance to be preserved plus the added diepoxybutane are subjected to varying conditions of temperature and time approximately within the ranges given above followed by microbiological examinations to determine the minimum heat processing levels required to ensure production of a sterile product. In any event, the combination of temperature and time so established will be substantially less than with conventional sterilization, that is, in the precence of the added diepoxybutane the temperature, the heating time, or both will be substantially less than required to attain sterility in the absence of diepoxybutane.

The preservation process of this invention is of wide versatility and can be applied to foodstuffs of every type, for example, fruits, vegetables, milk, eggs, meat, fish, cereal products, bread, cheese, and so forth. Liquid foodstuffs such as juices, concentrates, purees, sauces, soups, extracts, and beverages of every type are included. The method by which diepoxybutane is incorporated in the food is not critical. In case of foods packed with liquid—water, brine, syrup, puree, sauce, gravy, etc.—it is easiest to disperse the compound in the liquid and add this liquid to the pack. In the case of dry pack products, the food may be dipped in a solution of the compound or coated with a composition of the compound mixed with a suitable carrier such as salt, sugar, starch, algins, natural gums, gelatin, pectin, low-methoxyl pectins, methyl cellulose, edible waxes, edible oils, and so forth.

Although the invention is particularly adapted for the preservation of foods, it may also be applied for the preservation of any substance which is normally susceptible to microbial spoilage. Thus, for example, the invention may be applied for the preservation of such substances as animal glues and mucilages; dextrins; starch pastes and solutions; cosmetic, medicinal, and dental preparation; vitamin preparations; pastes, solutions, or other preparations of natural gums such as tragacanth, Arabic, acacia, karaya, locust bean, agar-agar, pectin, algin, etc.; fermentation broths, mashes, and residues from fermentation processes; whey; wines and vinegars; animal feeds and ingredients of animal feeds such as fish meals, blood meals, feather meal, meat scraps, bone meal, tankage, grains, and oil-seed meals; proteins and protein hydrolysates; textile printing pastes; paints containing proteins or other spoilable dispersing agents; solutions of bark extracts or other tanning agents; molasses; by-products or wastes that contain potentially valuable carbohydrate, proteinous or fat ingredients such as stick liquor, corn steep liquor, fruit cannery wastes, citrus peels, cull fruit and vegetables, tops of root vegetables, distillers' slops, pulp liquors, wash water from textile de-sizing operations, waste liquors from wool scouring plants, dairy and slaughter house wastes and liquors, etc.

The following example demonstrates particular conditions, steps, and materials within the scope of the invention. It is understood that this example is furnished only by way of illustration and not limitation.

In some of the runs, no additive was employed; in others, compounds outside of the scope of the invention were added. These experiments are included for comparison purposes only. The abbreviation "p.p.m." used herein means parts per million by weight.

*Example*

A series of tin cans were filled with chopped asparagus bearing a natural inoculum of thermophillic organisms. Some of the cans contained only the asparagus, to some was added diepoxybutane in the proportion designated below, to others were added various monoepoxides as listed below. All the cans were then sealed in the usual manner.

All of the cans were then heated to 240° F. (115° C.) in a retort designed for rapid heating and rapid cooling after the heating was completed. Different times of heating, varying from 4 min. to 55 min. were employed with different lots of cans (both control and treated).

The cans after cooling were stored at 50° C. for a month and the contents were then examined for spoilage. (This temperature of storage is nearly optimum for growth of the naturally contaminating thermophillic organisms, which have very heat resistant spores.) By this examination of the products it was possible to select the heating time which was just sufficient to prevent spoilage. For example, if a product spoiled after 5 min. heating but not after 7 minutes' heating, it was concluded that 7 minutes was the proper heating time.

The results obtained are tabulated below—

| Additive | Proportion of additive, p.p.m. | Time at 240° F. required to prevent spoilage, minutes |
|---|---|---|
| None (control) | | 30 to 55 |
| Diepoxybutane | 1,000 | 4 or less |
| Ethylene oxide | 600 | 20 |
| Propylene oxide | 3,000 | 14 |

Having thus described our invention, we claim:

1. A process for preserving a substance normally subject to microbial spoilage which comprises incorporating about from 50 to 1000 p.p.m. of diepoxybutane therewith and subjecting it to heat sufficient to produce an essentially sterile product, the combination of temperature and time of heating being substantially less than that required to attain sterility in the absence of diepoxybutane.

2. A process for preserving a foodstuff which is normally subject to microbial spoilage which comprises incorporating about from 50 to 1000 p.p.m. of diepoxybutane therewith and subjecting it to heat sufficient to produce an essentially sterile product, the combination of temperature and time of heating being substantially less than that required to attain sterility in the absence of diepoxybutane.

3. A process for preserving a substance normally subject to microbial spoilage which comprises incorporating about from 50 to 1000 p.p.m. of diepoxybutane with the substance, sealing the treated substance in a container, and subjecting it to heat at a temperature and for a time sufficient to produce an essentially sterile product, the combination of temperature and time of heating being substantially less than that required to attain sterility in the absence of diepoxybutane.

4. A process for preserving a food normally subject to microbial spoilage which comprises incorporating about from 50 to 1000 p.p.m. of diepoxybutane with the food, sealing the treated food in a container, and subjecting it to heat at a temperature and for a time sufficient to produce an essentially sterile product, the combination of temperature and time of heating being substantially less than that required to attain sterility in the absence of diepoxybutane.

References Cited in the file of this patent

UNITED STATES PATENTS

| 1,992,292 | Cox et al. | Feb. 26, 1935 |
| 2,890,119 | Minkler et al. | June 9, 1959 |

OTHER REFERENCES

Dairy Bacteriology, July 1950, page A97, section 488, article entitled Preservation of Foods With Antibiotics.

Food Industries, October 1950, pp. 40, 41 and 126.